United States Patent [19]

Pendergraft

[11] 4,419,038
[45] Dec. 6, 1983

[54] BUMPER MOUNTED FOLDABLE CRANE HOIST

[76] Inventor: Billy D. Pendergraft, 22321 Vanowen Ave., Canoga Park, Calif. 91303

[21] Appl. No.: 279,919

[22] Filed: Jul. 2, 1981

Related U.S. Application Data

[63] Continuation of Ser. No. 15,559, Feb. 26, 1979, abandoned.

[51] Int. Cl.³ .............. B60P 1/00; B60P 1/04; B66C 23/26; B66C 23/64
[52] U.S. Cl. ........................ 414/543; 212/182; 212/189; 212/252; 212/266; 414/467; 414/545; 414/549
[58] Field of Search ........... 414/467, 472, 539–545, 414/549–550, 558; 293/102, 106, 116, 117; 212/175, 181, 182, 187, 189, 223, 229, 244, 245, 252, 254, 266

[56] References Cited

U.S. PATENT DOCUMENTS

| 2,487,305 | 11/1949 | Bridegroom | 414/543 |
| 3,139,198 | 6/1964 | Penny et al. | 414/550 |
| 3,471,070 | 10/1969 | Olson | 293/106 |
| 3,501,170 | 3/1970 | Da Valle | 293/106 |
| 3,614,136 | 10/1971 | Dent | 293/106 |
| 3,854,594 | 12/1974 | Brookes | 414/543 |
| 4,109,930 | 8/1978 | Pihall | 293/117 |
| 4,127,295 | 11/1978 | Robinson | 293/117 |
| 4,138,152 | 2/1979 | Prue | 293/117 |

FOREIGN PATENT DOCUMENTS

| 207606 | 4/1957 | Austria | 414/543 |
| 73435 | 7/1960 | France | 414/539 |

*Primary Examiner*—Trygve M. Blix
*Assistant Examiner*—R. B. Johnson
*Attorney, Agent, or Firm*—Nilsson, Robbins, Dalgarn, Berliner, Carson & Wurst

[57] ABSTRACT

A foldable hoist assembly has an elongated column with a boom pivotally mounted at its outer end to be moveable from a stored position alongside the column to its operating position. A spindle with radial and thrust bearings in the support column base provides rotary support so that loads suspended from the bottom can be swung over and away from the load bed. The base of the support column is also pivotally mounted on a horizontal support structure affixed to the vehicle chassis, preferably in the position of a bumper below te rear edge of the load bed. With boom stored alongside, the support column is rotated from its upright operating position to be supported horizontally within the support structure leaving the load bed unobstructed.

9 Claims, 9 Drawing Figures

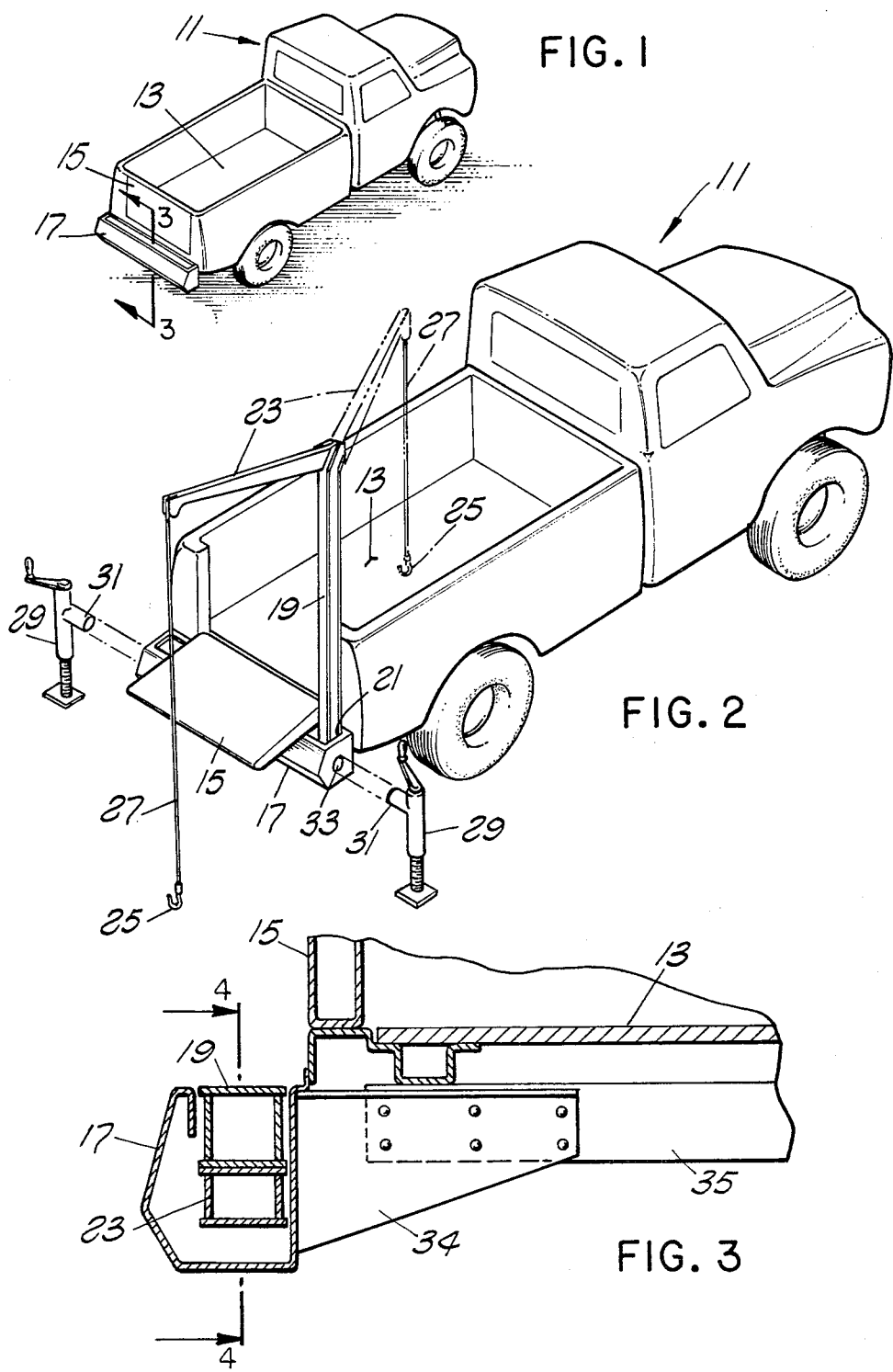

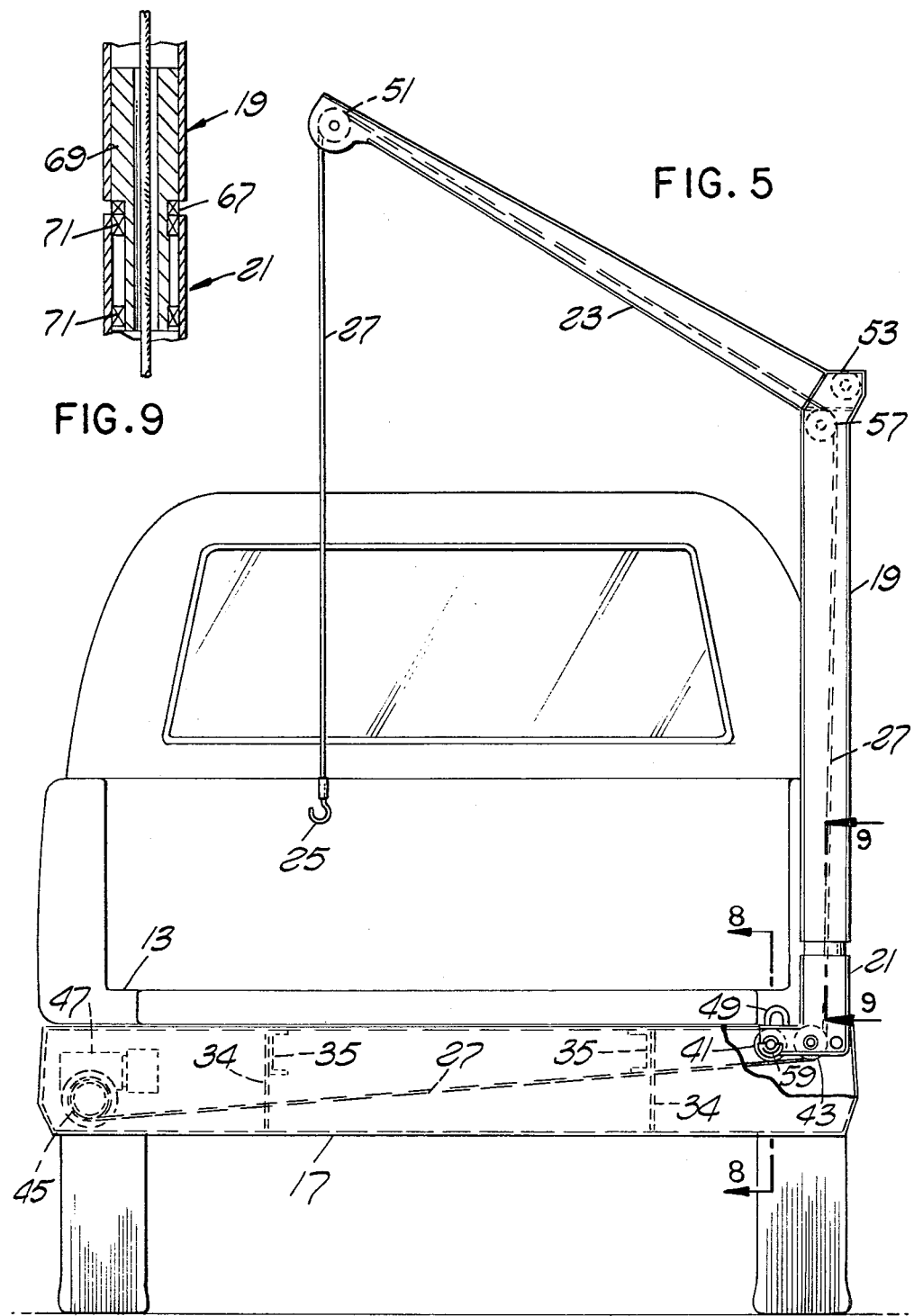

BUMPER MOUNTED FOLDABLE CRANE HOIST

CROSS-REFERENCE TO RELATED APPLICATION

This application is a continuation of application Ser. No. 015,559 filed on Feb. 26, 1979, now abandoned.

BACKGROUND OF THE INVENTION

1. Field of the Invention

Present invention relates to foldable hoist assemblies for vehicles such as pickup trucks.

2. Prior Art

Smaller trucks, particularly vans and pickup trucks are widely used for a variety of business and recreational purposes. Often such vehicles are used for hauling heavy materials and equipment that require a hoist for loading and unloading. Unless one is available at the site, the driver must carry his own hoist that takes up valuable load capacity or interferes with other use of the vehicle. For example, the adjustable hoist shown in U.S. Pat. No. 3,019,918 issued to H. M. Keener on Feb. 6, 1962 is permanently mounted either on the load bed itself or outside one of the box sidewalls where it must remain even when not in use.

Because of this, efforts have been made to design a portable hoist assembly that can be stored away or disassembled when not in use.

Ideally such portable hoist assemblies should be quickly and easily deployable when needed, yet not interfere with the load capacity or other normal functions of the vehicle. None of the portable hoist designs presently available provide such advantages. Foldable hoist assemblies, such as those shown in U.S. Pat. No. 3,794,192 issued to Charles B. Monson on Feb. 26, 1974 and U.S. Pat. No. 3,276,610 to C. R. Thatcher on Oct. 4, 1966, can be folded out of the way to not interfere significantly with the load bed capacity, but cover up the stake pockets that many pickup trucks provide for adding side boards to the box, and would have to removed entirely to permit installation of a camper shell for recreational use. In addition, such mechanisms could not be installed on van type vehicles, and in all of them the load forces must be borne by the relatively light sheet metal of the box.

Removable hoist structures, such as that shown in U.S. Pat. No. 3,918,592 issued to Jim N. Paul on Nov. 11, 1975, must be carried disassembled either in the truck box where available load space is taken up, or on a bulky rack attached to the truck. The removable hoist disclosed in U.S. Pat. No. 3,899,089 to N. J. Wardlaw issued Aug. 12, 1975, presents other problems in that the load can only be loaded by lifting over the sidewalls, instead of through the tailgate, and if not removed, still takes up some load bed space and is not suitable for van type vehicles or for installation of camper shells.

SUMMARY OF THE INVENTION

The foldable hoist assembly of this invention is mounted on a horizontal support structure at the rear of the pickup truck or similar vehicle, preferrable mounted below the back edge of the load bed in the position of a bumper. When deployed for operation, the hoist provides a horizontally extending boom that is rotatable about the axis of an upright support column. The inner end of the boom is pivotally mounted on a horizontal shaft at the top of the support column to be swung through a vertical arc between its operating position and a stored position alongside the support column. Similarly the base of the support column is pivoted on a horizontal shaft at one end of the support structure to be swung downwardly from its upright operating position with the boom alongside to a horizontal stored position on the support structure, thus permitting unobstructed access to the entire loadbed.

In its preferred form, the support structure has side, bottom and end walls forming an open box-shaped enclosure that also serves as a bumper. Like a bumper, the support structure is attached by brackets to the underlying rearward extensions of the vehicle chassis for added stability and strength. The shaft pivoting the base of the the support column extends between the sidewalls of the housing near one of the brackets so that the hoist load is transferred directly to the chassis instead of through the more flexible sheet metal of the truck body and the resilient suspension system.

A roller guide is mounted on a perpendicular projection that extends outward from the pivot on the support column base. The hoist line extends horizontally from a motor driven or crank operating capstan or take up reel at the far end of the support structure to pass over this roller and then through the hollow interior of the base and support column to the end of the boom.

With the hoist assembly in the stored position, the projection extends downwardly from the pivot so that a lifting force applied to the drive means with the free end of the hoist line affixed to this projection exerts leverage to move the support column to its upright position where a locking pin inserted through the hollow roller shaft to engage holes in the opposite sidewalls of the housing holds the support column rigidly in its upright position. With the support column erect, the boom is then swung in a vertical plane on its pivot through more than 180 degrees to rest on a load bearing surface formed at the upper end of the support column.

The support column has its outer extension rotably supported on the pivoted base by a spindle assembly containing radial and thrust bearing so that the boom can be swung with the upper end of the support column to move a suspended load over and away from the load bed.

The ends of the housing support structure may be provided with lug openings or the like in the end walls to be engaged by an outrigger jack placed on either side to give increased lateral support for handling heavier loads.

BRIEF DESCRIPTION OF DRAWINGS

FIG. 1 is a perspective view of a pickup truck type vehicle showing a preferred form of the foldable hoist assembly in accordance with the invention that is in its stored position within the bumper mounted housing structure;

FIG. 2 is a perspective view of the vehicle of FIG. 1 showing the foldable crane assembly with the support column and boom fully deployed in their operating positions;

FIG. 3 is a vertical cross sectional view taken along the line 3—3 of FIG. 1 showing the foldable hoist assembly in its stored position;

FIG. 5 is a back elevation view illustrating the foldable hoist assembly fully deployed in its operating position;

DETAILED DESCRIPTION

Figure 7:
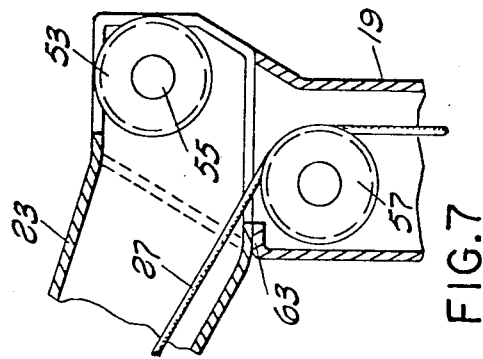
FIG. 7 is a partial cross sectional view taken along the line 7—7 of FIG. 6 showing the pivotal mounting of the boom on the upper extension of the support column.

Referring now to FIGS. 1 and 2, the preferred form of the foldable hoist assembly in accordance with the invention is mounted on a typical pickup truck 11 having an uncovered load bed 13 that is accessible through a tailgate 15. As shown in FIG. 1, the operating components of the hoist assembly are stored within a box-like housing support structure 17 mounted horizontally in the position of a bumper to extend slightly below and behind the rear edge of the load bed 13 where they are out of sight and do not interfere with or obstruct the normal appearance or utilization of the vehicle.

Referring now to FIG. 2, the foldable hoist assembly is fully deployed with an elongated support column 19 extending upwardly from its base 21 that is mounted at one end of the support structure 17. An elongated boom 23 extends horizontally at a slightly elevated angle from the top of support column and has a lifting hook 25 suspended from the end of a hoist line 27. The tailgate 15, as shown, is lowered to lie across the open top of the underlying support structure 17 as shown in FIG. 2. A pair of outrigger screw-operated jacks 29 may be deployed to engage either end of the support structure, such as by lug fittings 31 on the jack that fit within openings 33 formed in the end walls of the support structure, to provide increased lateral support and stability needed for handling heavier loads. The dashed phantom line of FIG. 2 indicates an alternative position of the boom 23 that is swung to move a load suspended from the hook 25 from outside the box to directly over the load bed 13.

Referring to FIG. 3, the elongated housing support structure 17 has a roughly rectangular cross section open at the top with bottom, front and rear sidewalls formed by bending a single piece of sheet metal. The front sidewall and bottom are substantially flat and formed at right angles to one another, whereas the rear sidewall is bulged outwardly to provide a degree of spring like resiliency to avoid damage or jamming of the interior components for minor rear end encounters. Also for this purpose, the upper portion of the rear sidewall is bent over and downwardly to form an internal lip that resists jamming of the side-wall against the hoist components stored inside.

Figure 6:
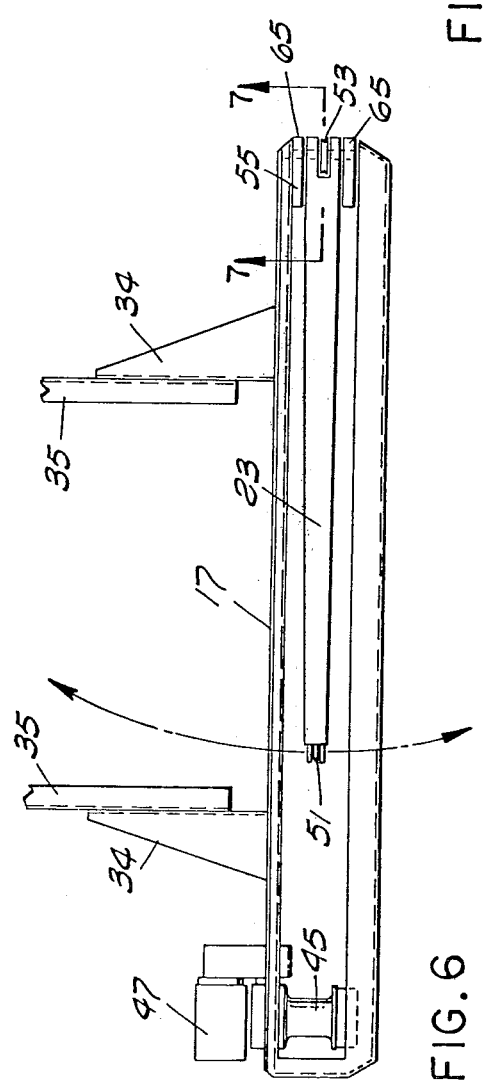
FIG. 6 is a partial top view of the fully deployed foldable hoist assembly in FIG. 5 with the truck bed broken away to show the bracket mounting on the vehicle chassis.

Both the elongated support column 19 and the boom 23 have a substantially rectangular cross section so that they fit snugly against one another when stored within the housing support structure 17. As can also be seen in FIG. 6, the housing support structure 17 is rigidly affixed by angle brackets 34 that are riveted or otherwise secured to the rear extensions 35 of the vehicle chassis like a conventional rear bumper. In this way, the load forces on the hoist are applied to the chassis rather than the more flexible and resilient body sheet metal of the truck load bed and sidewalls.

Figure 8:
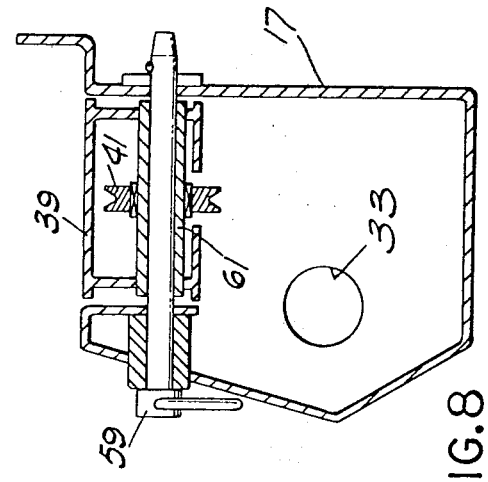
FIG. 8 is a cross-sectional view of the housing support structure taken along the line 8—8 of FIG. 5 showing the kingpin assembly for securing the hoist in its upright position; and, FIG. 9 is a partial cross sectional view taken along the line 9—9 of FIG. 5 showing the spindle configuration by which the upper extension of the support column is rotably mounted on the base.
Figure 4:
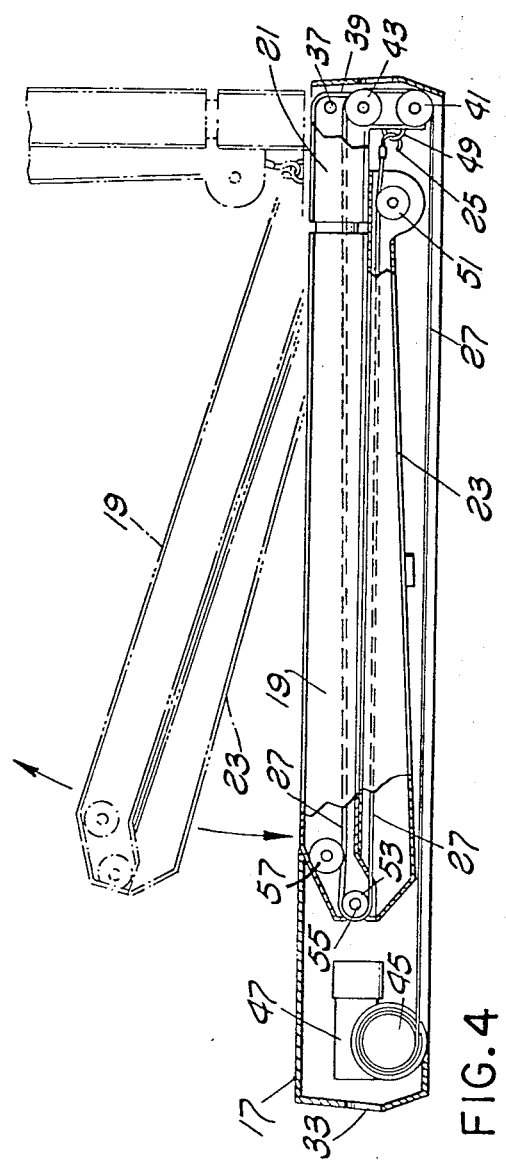
FIG. 4 is a partial vertical cross section taken along the line 4—4 of FIG. 3 illustrating the foldable hoist assembly in its stored position and having dashed phantom lines showing the support column with the folded boom in its partially raised and fully erect position.

Referring now to FIG. 4, an elevational view shows the hoist assembly in full line partial cross section stored horizontally within the housing support structure 17 with the boom 23 folded underneath to lie alongside the support column 19. The base 21 is pivoted on a horizontal shaft 37 supported at its ends in the back and front sidewalls of the housing support structure 17, which may be suitable reinforced as shown in FIG. 8. The base 21 is L-shaped with a perpendicular projection 39 extending radially outward from the pivot shaft 37 to point downwardly when the hoist assembly is in its stored position. The pivot shaft 37 extends through the outer edge of the L-shaped base 21 so that it is pivoted near its outer corner.

The base projection 39 also mounts a pair of roller guides 41 and 43 for the hoist line 27 which is fed from a capstan or take-up reel 45 at the opposite end of the housing structure 17. The outer roller guide 41 is journaled for rotation at the outer end of the projection 39 so that the hoist line 27 from the capstan 45 passes first over the outer roller guide 41 to the inner roller guide 43 where it is guided through the hollow interior of the base 21 and the support column 19. The drive capstan 45 can be powered by an appropriate electric or other type motor mounted with its gear mechanism on or adjacent the front sidewall of the housing support structure 17. The drive capstan might also be manually operated by insertion of a crank handle or the like if desired.

In erecting the hoist, the lifting hook 25 at the outer end of the hoist line 27 engages an eyelet 49 positioned outwardly on the base projection 39. From there the hoist line passes over a roller guide 51 on the end of the boom 23 to pass through its hollow interior to another roller guide 53 journaled on a shaft 55 that pivotally mounts the inner end of the boom 23 to the outer end of the support column 19. When the assembly is in its stored position, as shown in FIG. 4, the hoist line 27 extends between the roller guide 53 to pass adjacent the outer periphery of another roller guide 57 supported on the hollow support column 19 a slight distance inwardly from its tip and then through its hollow interior to the inner roller guide 43 in the base 21. Thus, when a take up force is applied to the drive capstan 45, the hoist line tension applies a leverage force in the horizontal direction on the outer guider roller 41 as well as on the eyelet 49, thus rotating the base projection 39 in a clockwise direction about the pivot shaft 37. The folded hoist assembly is thus pulled toward its upright position as indicated by the successive phantom line drawings in FIG. 4. Of course, the folded assembly may simply be erected manually if desired.

Referring now to FIGS. 5, 6, 7 and 8, when the support column 19 is upright, a removable king pin 59 is inserted through aligned openings in the front and back sidewalls of the housing support structure 17 to be engaged within a tubular shaft 61 that extends horizontally through the base projection 39, thereby locking the base 21 in its upright position. With the assembly upright, the lifting hook 25 can be disengaged from the eyelet 49 to free the end of the boom 23.

As shown in FIG. 7, the end walls at the intersection of the boom 23 and the support column 19 are cut away so that the boom 23 can be deployed by manual rotation about the pivot shaft 55 through an angle more than 180 degrees until it reaches an adjacent load supporting end surface 63 formed on the adjacent end portion of the support column 19. The boom 23 is thus deployed in its operating position extending horizontally outward at a slight upward angle. The upper end of the support column 19 has a slight outward and upward bend of its opposite walls that extend on either side of the boom 23 supporting the ends of the pivot shaft 55.

With the boom 23 deployed, the hoist line 27 passes from the drive capstan 45 through the open interior of the housing support structure 17 and over the inner roller guide 43 on the base 21, then upward through the hollow interior of the support column 19 to the roller guide 57 at its upper end, and from there through the hollow interior of the boom 23 diagonally upwards to the final roller guide 51 at the boom tip to the suspended hook 25 at the end.

Referring now to FIG. 9, the upper extension of the support column 19 is journaled for rotation on the fixed base 21 by means of an appropriate thrust bearing 67 that surrounds a hollow spindle 69 which has a rectangular upper section held within the support column 19 and a tubular lower portion extending downwardly into the base 21 to be engaged in upper and lower radial bearings 71. The boom 23 can thus rotate with the support column 19 through a 360 degree arc about its axis relative to the base 21 to shift loads suspended from the hook 25 to positions over and away from the load bed 13, as shown in FIG. 2.

The hoist assembly of the invention is thus easily erected from its stored position within the housing support structure 17 and is readily attached in the same manner as a bumper to the rear extensions of the vehicle chassis. It is noted that many pickup trucks and similar vehicles are normally sold without bumpers as standard equipment so that they must be separately purchased and mounted on the chassis in the same manner as this hoist assembly. Accordingly, the cost of the regular bumper as well as the cost of its installation can effectively be offset against the cost of this hoist assembly installation.

Conveniently, whenever work requiring the hoist is completed, the boom 23 can simply be folded back into place alongside the support column 19 so that the entire assembly can be lowered manually or with the help of the motor drive unit 47, into the housing support structure 17. When stored, the hoist assembly is completely out of the way and does not interfere with any of the standard uses of the vehicle or take up valuable load bed space within the box. Thus, sideboards may be added by insertion into the stake pockets if provided, and camper shells can be installed without first having to disassemble any portion of the hoist assembly. In this regard, the hoist can still be used in loading supplies or equipment into the camper shell itself and may even be used for vans and similar types of vehicles with permanent covers to lift heavy loads up to the level of the load bed.

In a simpler and less expensive form, where the added expense and convenience of a motor driven hoist is not desirable, the roller guides may be eliminated in favor of a simple shackle at the outer end of the boom 23 to support a hand cranked hoist.

It should also be appreciated that, while this invention had been described in relation to a preferred embodiment for pickup trucks and similar vehicles, various modifications may be made in the design and arrangement of the components and other details of the structure without departing from the scope of the invention as set forth in the appended claims.

What is claimed is:

1. A bumper mounted foldable crane hoist for vehicles having a chassis and a load bed with a tail gate forming an access opening to said load bed comprising:

an elongated horizontal housing structure having a bottom and spaced apart end and side walls, means affixed to one of said side wall for mounting said housing to the vehicle chassis below the level of the load bed along the edge of the access opening, said housing forming a bumper for the vehicle;

an elongated support column with a base section attached to one end thereof, shaft means pivotally mounting: said base section on a horizontal axis between said side walls at one end of said housing structure to facilitate the movement of said support column in a vertical plane relative to said housing structure from a stored horizontal position with said support column lying within and extending along the length of said housing structure to a fixed upright operating position with said support column disposed perpendicular to said housing structure; means on said base section for maintaining said support column in said fixed upright operating position;

an elongated boom pivotally mounted on the other end of said support column opposite said base section to move from a stored position alongside said support column to an operating position extending outwardly from the axis of said support column;

a hoist line mounted on said boom for handling a load, means on said housing for applying a hoisting force to said hoist line, means mounted on said base section which are selectively and operatively connectable with said hoist line to pivot said support column to said upright operating position;

anti-friction bearing means mounted within said support column and base section for supporting said boom for rotation about the central axis of said support column relative to said base section to shift loads suspended by said hoist line over and away from said load bed.

2. The bumper mounted foldable crane hoist of claim 1 wherein:

said housing structure is an open top box-shaped enclosure that is mounted at the rear of the vehicle in the position of a bumper with said side and bottom walls surrounding the sides and bottom of said support column and said boom in their stored positions.

3. The bumper mounted foldable crane hoist of claim 2 wherein:

said means affixed to one of said side wall includes spaced apart bracket means affixed near opposite ends of said box-shaped enclosure to be mounted on adjacent rearward extensions of the vehicle chassis normally used to mount a rear bumper; and, said elongated support column is pivotally mounted between the side walls of said box-shaped enclosure adjacent one of said bracket means.

4. The bumper mounted foldable crane hoist of claim 1 wherein:

said support column has an outward extension rotatably supported on said base section to rotate with said boom relative to said base section during operation to swing loads suspended beneath the outer end of said boom between positions over and away from said load bed.

5. The bumper mounted foldable crane hoist of claim 4 further comprising:
spindle means having anti-friction radial and thrust bearing means for rotatably supporting said outward extension.

6. The bumper mounted foldable crane hoist of claim 1 further comprising:
said hoist line having a free end attachable to a load;
said means for applying a hoisting force includes drive means mounted on one end of said housing; and
guide means for maintaining the hoist line in a path from the drive means along the support column to the outer end of said boom where a load attached to the free end is suspended beneath.

7. The bumper mounted foldable crane hoist of claim 1 wherein:
said base section has an L-shape with a rigid projection extending radially outward from the pivotal mounting on said base section and perpendicular to the axis of elongation of said support column; and,
said means for maintaining said support column in said fixed operating position includes releasable engaging means for rigidly securing said projection at a location near its outer end away from the pivotal mounting on said base section to said housing structure to hold said support column in a rigid upright position.

8. The bumper mounted foldable crane hoist of claim 7 comprising:
said means for applying a hoisting force includes drive means disposed within said house at one end thereof; and,
guide means for maintaining the hoist line in a path from the drive means along the support column to the outer end of said boom.

9. The bumper mounted foldable crane hoist of claim 8 wherein:
said hoist line guide means includes a first guide roller at the far end of said support column and a second guide roller mounted on said base section adjacent the outer end of said rigid projection to be below the pivotal mounting on said base section when said support column is in its stored horizontal position, said hoist line extending from said drive means to pass under and around said second guide roller to said first guide roller at the far end of said support column and back to said rigid projection, and said means to selectively pivot said support column to said operating position includes means for attaching the free end of said hoist line adjacent said second roller whereby application of a hoisting force by said drive means applies an upward leverage force on said second guide roller and on said attaching means for pivoting said support column to its upright operating position.

* * * * *